US008743853B2

(12) United States Patent
Taaghol et al.

(10) Patent No.: US 8,743,853 B2
(45) Date of Patent: *Jun. 3, 2014

(54) TECHNIQUES TO INCLUDE VIRTUAL PRIVATE NETWORKS IN A UNIVERSAL SERVICES INTERFACE

(75) Inventors: Pouya Taaghol, San Jose, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 11/745,554

(22) Filed: May 8, 2007

(65) Prior Publication Data

US 2008/0279136 A1    Nov. 13, 2008

(51) Int. Cl.
*H04W 4/00*    (2009.01)
(52) U.S. Cl.
USPC ............................ 370/341; 370/447; 709/220
(58) Field of Classification Search
USPC .................... 370/395.2, 328, 329; 455/422.1; 709/230, 237
See application file for complete search history.

(56) References Cited

U.S. PATENT DOCUMENTS

| 2004/0203866 A1* | 10/2004 | Sahinoglu et al. | 455/456.1 |
| 2009/0100514 A1* | 4/2009 | Jin et al. | 726/15 |
| 2009/0172805 A1* | 7/2009 | Tashjian et al. | 726/15 |
| 2011/0112946 A1* | 5/2011 | Porter | 705/35 |
| 2012/0084411 A1* | 4/2012 | Sood et al. | 709/220 |

FOREIGN PATENT DOCUMENTS

| EP | 1176781 A2 | 1/2002 |
| EP | 1396964 A2 | 3/2004 |
| JP | 10032610 A | 2/1998 |
| JP | 2002111732 A | 4/2002 |
| WO | 2006/104324 A1 | 10/2006 |
| WO | 2008/140902 A1 | 11/2008 |

OTHER PUBLICATIONS

HP; Universal Service Processor (USP) for OpenVMS Alpha Aug. 21, 2003.*
International Preliminary Report on Patentability received for PCT Patent Application No. PCT/US2008/061107, mailed on Nov. 19, 2009, pp. 2.
International Search Report/Written Opinion for Patent Application No. PCT/US2008/061107, mailed Sep. 25, 2008, 11 Pages.
Office Action Received for the Chinese Patent Application No. 200880023793.1, mailed on Jun. 15, 2012, 4 pages of Office Action including 1 page of English Translation.
Office Action Received for the Chinese Patent Application No. 200880023793.1, mailed on Feb 22, 2013, 12 pages of Office Action including 6 pages of English translation.
Martini, et al.,"Service Plane-aided Visualization of Virtual Topology in transport networks," ICTA, Hammamet, Tunisia, Apr. 12-14, 2007, 20 pages.
Office action received for Chinese patent application No. 200880023793.1 mailed on Sep. 12, 2013, 6 Pages of office action including 3 Pages of English Translation.

* cited by examiner

*Primary Examiner* — Steven H Nguyen
*Assistant Examiner* — Henry Baron
(74) *Attorney, Agent, or Firm* — Thorpe North & Western, LLP

(57) ABSTRACT

An embodiment of the present invention provides an apparatus, comprising a mobile station (MS) operable to communicate in a wireless network, the wireless network including a Universal Services Interface (USI) and wherein the MS includes a USI client adapted to monitor external IP addresses of the MS and if the MS enters a virtual private network (VPN) via a VPN tunnel, the external IP address of the VPN tunnel is cached.

17 Claims, 3 Drawing Sheets

TECHNIQUES TO INCLUDE VIRTUAL PRIVATE NETWORKS IN A UNIVERSAL SERVICES INTERFACE

BACKGROUND

There is ongoing interest in developing and deploying mobile networks that may facilitate transfer of information at broadband bandwidth and rates. These networks are colloquially referred to herein as broadband wireless access (BWA) networks and may include networks operating in conformance with one or more protocols specified by the 3rd Generation Partnership Project (3GPP) and its derivatives or the Institute for Electrical and Electronic Engineers (IEEE) 802.16 standards (e.g., IEEE 802.16-2005) although the embodiments discussed herein are not necessarily so limited. IEEE 802.16 compliant BWA networks are sometimes referred to as WiMAX networks, an acronym that stands for Worldwide Interoperability for Microwave Access, which is a certification mark for products that pass conformity and interoperability tests for the IEEE 802.16 standards Service providers have been looking for a technology that enables convergence of the service layer, such that value-add services, which can be easily deployed. To fill this gap, the mobile industry (more specifically the 3rd Generation Partnership Project (3GPP)) has created a comprehensive all-IP network named Internet Protocol (IP) Multimedia Subsystem (IMS). The promise of convergence by IMS is being weighed against its complexity both on the network side and the client device side. This has led the industry to question suitability of IMS as a convergence technology of choice.

In modeling the deployment and implementation of WiMAX networks, there are ongoing questions on how to best integrate cooperation between service providers (SPs), which are the providers that operate network infrastructure and provide wireless access to subscribers, and Internet Application Service providers (IASPS) (e.g., GOOGLE®, YAHOO®, etc.), which are providers that offer aggregated content on the public Internet Protocol (IP) networks including content providers (CPs) and/or Internet advertisers (IAs).

USI is a simple yet effective architecture to address the very requirements IMS failed to fulfill. The proposed architecture, named Universal Services Interface (USI) is a simple, flexible, Internet friendly solution that enables service provider to sell value-add services by simple interfacing to content providers.

A strong need exists for techniques for USI when the users are on a VPN.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
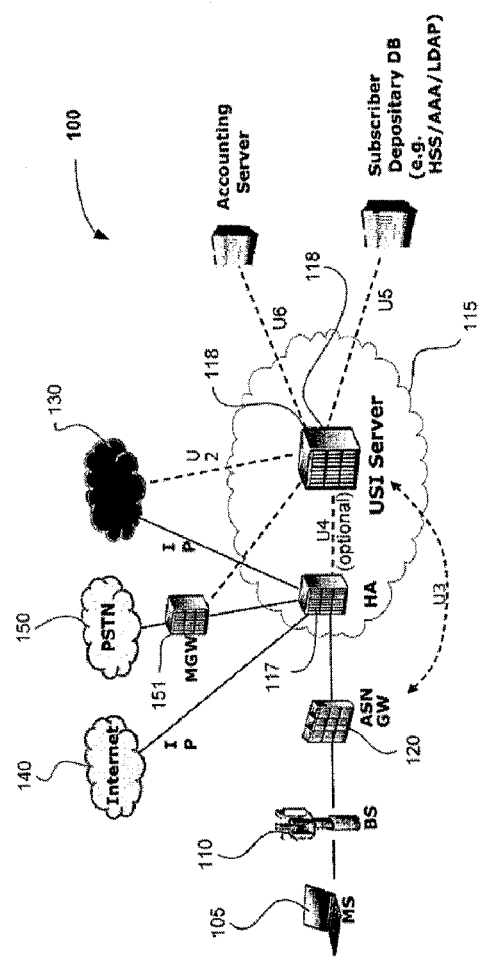
FIG. 1 is functional block diagram of a network architecture according to various inventive embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

There are two general models which are generally known to provide integration between SPs and IASPs including: (i) the old cellular or "walled garden" model in which content is provided entirely through SP's control environments; and (ii) the open model in which content is provided by IASP transparently via the SP.

The walled garden model had advantages for the SP in that it had full control on content accessed by the user. However the limited content typically provided by the SPs was incomparable with those of Internet, and thus failed to attract widespread user interest.

The open model is attractive to users because it may provide nearly unlimited content. However, because the SP is transparent to transactions in this model, there is no revenue opportunity for the SP beyond access usage. Furthermore, because mobile station location is not known by the IASPs, without some input from SPs, there are limits on enhanced services which may be provided.

A recent model of content solutions for wireless broadband networks is defined in which improved content may be provided by IASPs with the SP's assistance. This model is referred to herein as the universal services interface (USI) model or Internet+ model. The USI model proposed herein is beneficial to users, IASPs and SPs in that users may obtain a wider variety of content than previously available, SPs can benefit from additional revenue sharing, and IASPs can offer better, more convenient, and/or smarter services to users.

Turning to FIG. 1, an example network architecture 100 for implementing the USI model is shown. According to one exemplary implementation, a mobile station (MS) 105, for example subscriber stations using protocols compatible with the IEEE 802.16 standards (e.g., IEEE 802.16-2005 Amendment), may communicate via an over-the-air (OTA) interface with a base station (BS) 110 to connect with a connectivity service network (CSN) 115 operated by a service provider.

In certain example implementations, communications between subscribers via BS 110 to CSN 115 may be facilitated via one or more access service network gateways (ASNGW) 120 although the inventive embodiments are not limited to this specific type of network implementation. ASNGW 120 (or other similar type of network node) acts as an interface between core network 115 and a plurality of base stations 110 and may function as a type of BS controller and/or mobile switching center (MSC) to facilitate handover control and other functions for a radio access network (RAN), although the embodiments are not so limited.

Connectivity service network (CSN) 115, in certain example embodiments, may include a home agent (HA) 117 (or similar type of network node) and a new type of network node referred to herein as a USI Server 118 which acts as a gateway for the interaction with the application service provider (IASP) 130 such as GOOGLE®, etc. Home agent 117 may serve as a seamless Internet Protocol (IP) traffic hub to connect mobile stations (e.g., MS 105) with other non-service provider networks or entities such as a public Internet network 140, a public switched telephone network (PSTN) 150 and/or IASP 130. In actuality, IASP 130 may be part of Internet network 140 but is shown separately in FIG. 1 to highlight various interactions with the service provider's CSN 115. If desired, a media gateway (MGW) node 151 may be used to convert circuit-switched communications to IP communications or vice versa between home agent 117 and PSTN 150 although the inventive embodiments are not limited in this respect.

According to certain embodiments, an accounting server 160 and/or subscriber depository database 170 may also be included in network 100. Accounting server 160 may be coupled with service provider's CSN 115 to authenticate/track user subscriptions (e.g., to track user charges) while database 170 may be used to store customer profiles and/or personal data and preferences of subscribers (e.g., to identify users and authorized services). In certain embodiments, server 160 and database 170 may be combine in a single node. To this end, the description and illustration of network 100 represents logical entities and thus arrangements of certain entities could be combined with others or separated from one another according to network design preference and/or physical constraints.

According to the example network architecture in FIG. 1, the key logical interfaces for network 100 are as follows:

U2 interface: between the IASP 130 and the USI server 118;

U3 interface; between the ASN 120 and the USI server 118; and

U4 interface; an optional interface between HA 117 and the USI server 118.

USI Server 118 may also have interfaces U6 to accounting server 160 and U5 to subscriber depository DB 170 for content charging records and/or service authorization and user privilege.

According to certain inventive embodiments the U2 interface between IASP 130 and USI server 118 may be used primarily for user identification (e.g., user of mobile station 105) as well as any other interaction described herein between the service provider network and the IASP 130.

The U3 interface between USI server 118 and ASNGW 120 is a signaling and hotlining interface which in certain embodiments may support functions for location services, presence, provisioning, etc.

Location services: upon the association of MS 105 with a new serving gateway (SGW) (e.g., anchor paging controller (APC) or ASN-GW 120), either via inter-ASN handover or anchor PC relocation, the new SGW handshakes with USI server 118 via U3 to inform the change in the SGW for MS 105. When accurate location of MS 105 is requested by a content provider (e.g., IASP 130), USI 118 may contact the SGW to begin location measurements.

Presence: when MS 105 performs network entry/exit or idle mode entry/exit, in a particular ASN-GW, the GW handshakes with USI server 118 via U3 to convey presence (or lack thereof) information.

Provisioning: if USI server 118 also functions as a provisioning server, U3 can be used for signaling of provisioning operations (e.g., Provisioning start, Provisioning complete, etc.). Additionally, MS 105 can be hot-lined to USI server 118 via U3 until provisioning is complete.

In certain embodiments, an optional U4 interface may be used for quality-of-service (QoS) signaling between home agent 117 and USI 118 for managed QoS services like IP television (IPTV). In other embodiments, U4 is omitted and the foregoing signaling may be conveyed directly to ASN-GW 120 via the U3 interface.

In some embodiments of the present invention, when the user is on a VPN there are two IP addresses for the user, the inner IP address (Assigned by the VPN termination point) and the outer IP address (Assigned by the operator). In USI, the iASP typically uses the outer IP address to determine which operator the user is coming from, but this fails in the case of VPN, because, the ASP can only see the inner IP address now and based on the inner IP address, it can no longer figure out which operator the user is coming from.

In order to generically handle the VPN issue, an embodiment of the present invention provides the installation of a USI client on the user device, which basically may:

a) Monitor the IP addresses on the user device. In the event that the user enters a VPN, it caches the external IP address of the VPN tunnel.

b) Store some or all of the USI context as required by the ASP. For example the device could store its current location information, QoS context etc.

When the user device accesses an ASP through VPN, the USI client could include the following information as part of the "ASP request" message a) The external IP address;
b) Some or all the USI context; and
c) Both a) and b).

In an embodiment of the present invention, this information may be bundled into the "ASP request" by using XML.

When the ASP receives the "ASP request" message from the user device, the ASP now has the external IP address (using which it can determine the WiMAX network and access the USI context for this user from the USI server) and/or the USI context itself. Using these parameters, the ASP can now provide the same value add service for the VPN user as compared to a non VPN user.

Figure 2:
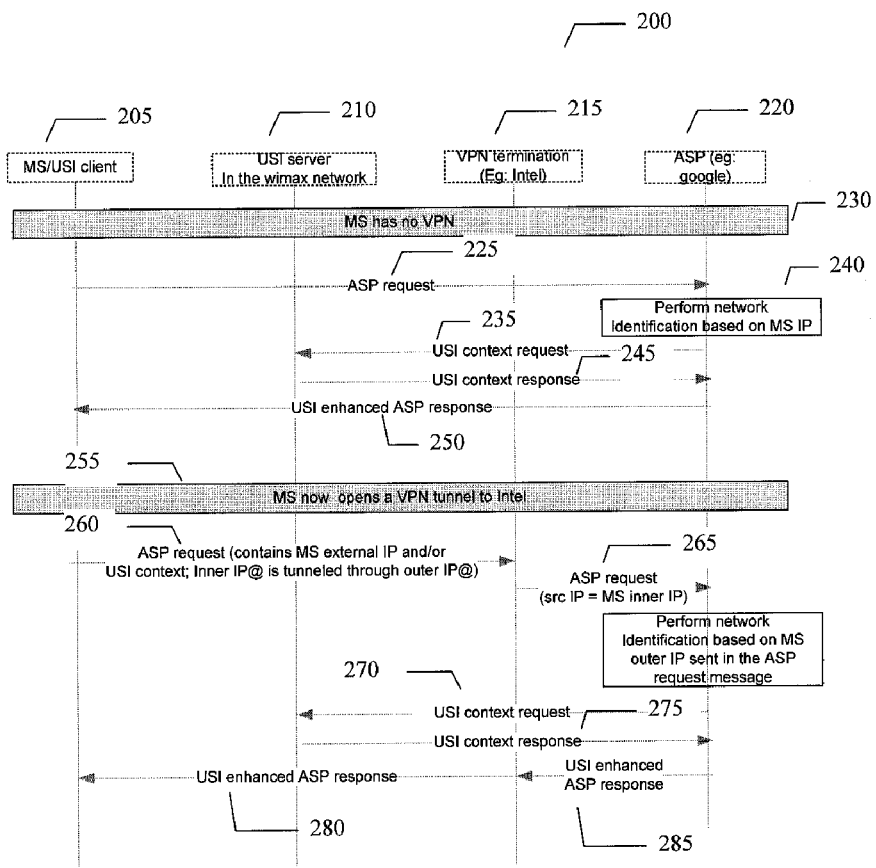
FIG. 2 illustrates USI operation with and without VPN in accordance with an embodiment of the invention.

Turning now to FIG. 2 at 200 is an illustration of USI operation with 230 and without 255 VPN in accordance with an embodiment of the invention. For the normal operation without VPN, at 225 an ASP request is sent to ASP 220 from MS/USI client 205. At 240 perform network identification based on MS IP. At 235 send USI context request from ASP 220 to USI server in a WiMAX network 210. At 245 USI context response sent from 210 to ASP 220 and at 250 USI enhanced ASP response sent from ASP 220 to MS/USI client 205.

Looking now at MS with VPN in accordance with an embodiment of the present invention, at 255 MS now opens a VPN tunnel and at 260 ASP request is sent from MS/USI client 205 to VPN termination 215. From VPN termination 215 an ASP request 265 is sent to ASP 220. At 270 USI context is requested from USI server 210 with USI server 21 sending a USI context response at 275. ASP 220 at 285 sends USI enhanced ASP response 285 to VPN 215 which then sends USI enhanced ASP response 280 to MS/USI client 205.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Figure 3:
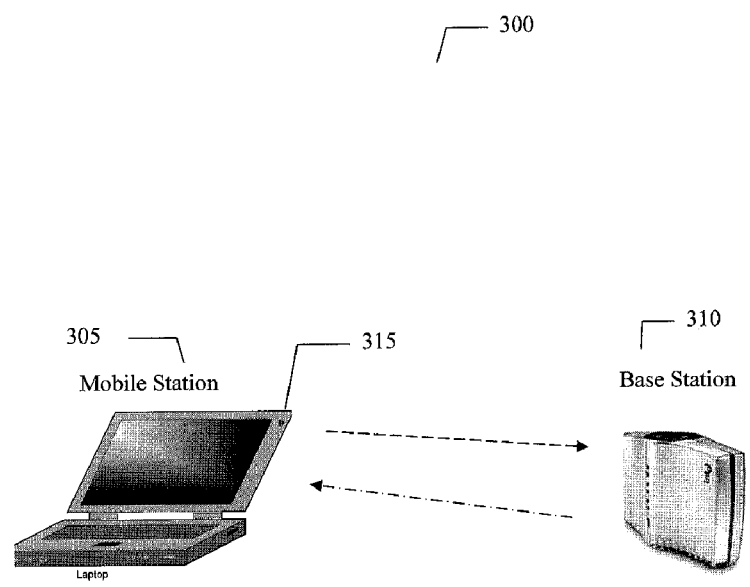
FIG. 3 is system according in accordance with an embodiment of the present invention.

Some embodiments of the invention may be implemented, for example, using a machine-readable medium or article which may store an instruction or a set of instructions that, if executed by a machine, for example, by system 300 of FIG. 3, by mobile station 305 of FIG. 3 which may include a processor (not shown) and antenna 315, or by other suitable machines, cause the machine to perform a method and/or operations in accordance with embodiments of the invention. Mobile station 305 may be in communication with base station 310. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a mobile station (MS) operable to communicate in a wireless network, said wireless network including a Universal Services Interface (USI); and
wherein said MS includes a USI client adapted to monitor external IP addresses and if said MS enters a virtual private network (VPN) via a VPN tunnel, the external IP address of said VPN tunnel is cached, wherein when said MS accesses an application service provider (ASP) through said VPN, said USI client includes from said cache said external IP address of said VPN tunnel for said MS as part of an ASP request message, wherein said ASP uses said external IP address included in said ASP request message to access USI context associated with said USI client.

2. The apparatus of claim 1, wherein said USI client stores some or all of USI context as required by said ASP.

3. The apparatus of claim 2, wherein when said MS accesses an ASP through said VPN, said USI client includes some or all of said USI context as part of said ASP request message.

4. The apparatus of claim 1, wherein said ASP request is bundled by using XML.

5. The apparatus of claim 3, wherein said USI context comprises said MS's current location information and/or quality of service (QoS).

6. A method, comprising:
including a USI client in a mobile station (MS) operable to communicate in a wireless network that includes a Universal Services Interface, said USI client adapted to monitor external IP addresses; and
wherein if said MS enters a virtual private network (VPN) via a VPN tunnel, the external IP address of said VPN tunnel is cached; and
further comprising including from said cache said external IP address of said VPN tunnel for said MS as part of an ASP request message when said MS accesses an application service provider (ASP) through said VPN, wherein said ASP uses said external IP address included in said ASP request message to access USI context associated with said USI client.

7. The method of claim 6, further comprising storing by said USI client some or all of USI context as required by said ASP.

8. The method of claim 7, further comprising including by said USI client some or all of said USI context as part of said ASP request message when said MS accesses an ASP through said VPN.

9. The apparatus of claim 6, further comprising using XML to bundle said ASP request.

10. The method of claim 8, wherein said USI context comprises said MS's current location information and/or quality of service (QoS).

11. A non-transitory machine-accessible medium that provides instructions, which when accessed, cause a machine to perform operations comprising:
including a USI client in a mobile station (MS) operable to communicate in a wireless network that includes a Universal Services Interface, said USI client adapted to monitor external IP addresses of said mobile station (MS); and
wherein if said MS enters a virtual private network (VPN) via a VPN tunnel, the external IP address of said VPN tunnel is cached; and
further comprising said instructions causing said machine to perform operations further comprising including from said cache said external IP address of said VPN tunnel for said MS as part of an ASP request message when said MS accesses an application service provider (ASP) through said VPN, wherein said ASP uses external IP address included in said ASP request message to access USI context associated with said USI client.

12. The non-transitory machine-accessible medium of claim 11, further comprising said instructions causing said machine to perform operations further comprising storing by said USI client some or all of USI context as required by said ASP.

13. The non-transitory machine-accessible medium of claim 12, further comprising said instructions causing said machine to perform operations further comprising including by said USI client some or all of said USI context as part of said ASP request message when said MS accesses an ASP through said VPN.

14. The non-transitory machine-accessible medium of claim 11, further comprising said instructions causing said machine to perform operations further comprising using XML to bundle said ASP request.

15. The non-transitory machine-accessible medium of claim 13, wherein said USI context comprises said MS's current location information and/or quality of service (QoS).

16. A system, comprising:
a wireless network including a Universal Services Interface (USI);
a USI client associated with a mobile station (MS) operable to communicate in said wireless network, said USI client adapted to monitor external IP addresses of said MS and if said MS enters a virtual private network (VPN) via a VPN tunnel, the external IP address of said VPN tunnel is cached; and
wherein when said MS accesses an application service provider (ASP) through said VPN, said USI client includes from said cache said external IP address of said VPN tunnel for said MS as part of an ASP request message, wherein said ASP uses external IP address included in said ASP request message to access USI context associated with said USI client.

17. The system of claim 16, wherein said USI client stores some or all of USI context as required by said ASP.

* * * * *

UNITED STATES PATENT AND TRADEMARK OFFICE
CERTIFICATE OF CORRECTION

PATENT NO.         : 8,743,853 B2                                      Page 1 of 1
APPLICATION NO.    : 11/745554
DATED              : June 3, 2014
INVENTOR(S)        : Pouya Taaghol et al.

It is certified that error appears in the above-identified patent and that said Letters Patent is hereby corrected as shown below:

In the Claims:

In column 7, line 28, in claim 9, delete "apparatus" and insert -- method --, therefor.

Signed and Sealed this
Twenty-third Day of September, 2014

Michelle K. Lee
*Deputy Director of the United States Patent and Trademark Office*